(12) United States Patent
Passarella et al.

(10) Patent No.: US 7,831,237 B2
(45) Date of Patent: Nov. 9, 2010

(54) AUTHENTICATING MOBILE NETWORK PROVIDER EQUIPMENT

(75) Inventors: Rossano Passarella, Mukilteo, WA (US); William M. Stevens, Oroville, WA (US); Jayesh Sukumaran, Woodinville, WA (US); Donald P. Wahlstrom, Woodinville, WA (US); Yan Zhang, Bellevue, WA (US)

(73) Assignee: Broadcom Corporation, Irvine, CA (US)

( * ) Notice: Subject to any disclaimer, the term of this patent is extended or adjusted under 35 U.S.C. 154(b) by 202 days.

(21) Appl. No.: 11/516,470

(22) Filed: Sep. 5, 2006

(65) Prior Publication Data

US 2007/0186108 A1 Aug. 9, 2007

Related U.S. Application Data

(60) Provisional application No. 60/765,259, filed on Feb. 3, 2006.

(51) Int. Cl.
*H04M 1/66* (2006.01)
(52) U.S. Cl. .............. 455/411; 455/410; 455/424; 455/435; 455/433; 709/225; 709/227; 709/228; 709/229; 713/153; 713/155; 726/12; 726/27; 726/29; 726/30
(58) Field of Classification Search .......... 455/410, 455/411, 433, 432.2, 437, 509, 424, 435; 370/331, 508; 380/247; 709/225, 227–229; 713/153, 155; 726/2–6, 12, 27–30
See application file for complete search history.

(56) References Cited

U.S. PATENT DOCUMENTS 5,729,537 A * 3/1998 Billstrom .................... 370/329
7,263,076 B1 * 8/2007 Leibovitz et al. ............ 370/310
2002/0012433 A1 * 1/2002 Haverinen et al. ........... 380/247
2004/0224667 A1 * 11/2004 Jain et al. .................... 455/411
2005/0101295 A1 * 5/2005 Rupp et al. .................. 455/411
2005/0124345 A1 * 6/2005 Laroia et al. ................ 455/437
2005/0130654 A1 * 6/2005 Di Claudio et al. .......... 455/433
2006/0009247 A1 * 1/2006 Kelley et al. ................ 455/515
2006/0079205 A1 * 4/2006 Semple et al. ............... 455/411
2007/0173229 A1 * 7/2007 Dong et al. .................. 455/411
2008/0081592 A1 * 4/2008 Das et al. .................... 455/406
2008/0104399 A1 * 5/2008 Fascenda .................... 713/168
2008/0119187 A1 * 5/2008 Gallagher et al. ............ 455/436
2008/0160959 A1 * 7/2008 Huang et al. ................ 455/411
2008/0293377 A1 * 11/2008 Pauliac ....................... 455/411
2009/0239502 A1 * 9/2009 Dempo et al. ............... 455/411
2009/0253411 A1 * 10/2009 Arkko et al. ................ 455/411
2010/0009659 A1 * 1/2010 Netanel et al. .............. 455/411

* cited by examiner

*Primary Examiner*—Kamran Afshar
*Assistant Examiner*—Babar Sarwar
(74) *Attorney, Agent, or Firm*—McAndrews, Held & Malloy, Ltd.

(57) ABSTRACT

Providing mobile network security is disclosed. A first mobile network provider equipment registers using a secret data that is known to a registration entity with which the first mobile network provider equipment is configured to register and embodied in a physical device associated with the first mobile network provider equipment in a manner that enables the physical device to be used to perform a cryptographic function using the secret data but prevents the physical device from being used to provide the secret data as output. An encryption data usable to communicate securely with a second mobile network provider equipment over a packet data network is received from the registration entity.

31 Claims, 6 Drawing Sheets

AUTHENTICATING MOBILE NETWORK PROVIDER EQUIPMENT

CROSS REFERENCE TO OTHER APPLICATIONS

This application claims priority to U.S. Provisional Patent Application No. 60/765,259 entitled AUTHENTICATING MOBILE NETWORK PROVIDER EQUIPMENT filed Feb. 3, 2006, which is incorporated herein by reference for all purposes.

BACKGROUND OF THE INVENTION

Traditionally mobile network base transceiver stations (BTS) have exchanged data with the core mobile network via a dedicated, high capacity connection to an associated base station controller (BSC), e.g., a dedicated T-1/E-1 line. In some cases, it may be desirable to use an IP or other packet data network to enable a BTS to exchange data with a BSC. However, care must be taken to ensure that a BTS attempting to connect with other mobile network elements via a packet data network is legitimate and to protect the privacy of call data sent via the network.

Therefore, there is a need for a way to authenticate a BTS or other equipment that attempts to connect and/or communicate via a packet data network with one or more other mobile network elements, and for a secure way to exchange keys and/or other security data required to use secure network communication protocols to send call data over a packet data network.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Authenticating mobile network provider equipment, e.g., to facilitate communication via a packet data network, is disclosed. The mobile network provider equipment is used in providing mobile network service to user equipment. As used herein, the term "mobile network provider equipment" includes any equipment on the provider network side of the air link to subscriber or other user mobile equipment (ME), such as a mobile phone, and does not include such user mobile equipment, even if owned by the provider (and, e.g., leased to the subscriber/user). In some embodiments, a physical device, such as a smart card, referred to herein as an equipment identification module (EIM), is provided and installed on a first mobile network equipment, such as a BTS, e.g., at provisioning/configuration time. A secret embodied in the EIM, and which the EIM is configured to use to perform one or more cryptographic functions, is known to a second equipment associated with the mobile network, e.g., a registration server or other system with which the first mobile network equipment is configured to authenticate itself as part of a registration or similar process, and the first and second equipment use the shared secret to mutually authenticate. In some embodiments, the EIM is similar in to a subscriber identity module (SIM) used to authenticate (e.g., GSM) mobile phones. A SIM is essentially an application of smart phone technology. The SIM embodies a secret that the SIM cannot be made to provide as output but that the SIM is programmed to use to perform one or more cryptographic functions used to authenticate the associated phone to the mobile network, i.e., as an equipment authorized to access the network under a subscriber/account with which the key embodied in the SIM is associated. In some embodiments, the EIM is configured to perform one or more authentication related cryptographic functions, using the secret embodied in the EIM; but the EIM cannot be made to provide as output or otherwise disclose the secret. Once the first and second equipment have mutually authenticated, in some embodiments the second equipment generates and sends to the first equipment via a secure connection a set of keys to be used to send call data securely over the packet data network.

Figure 1:
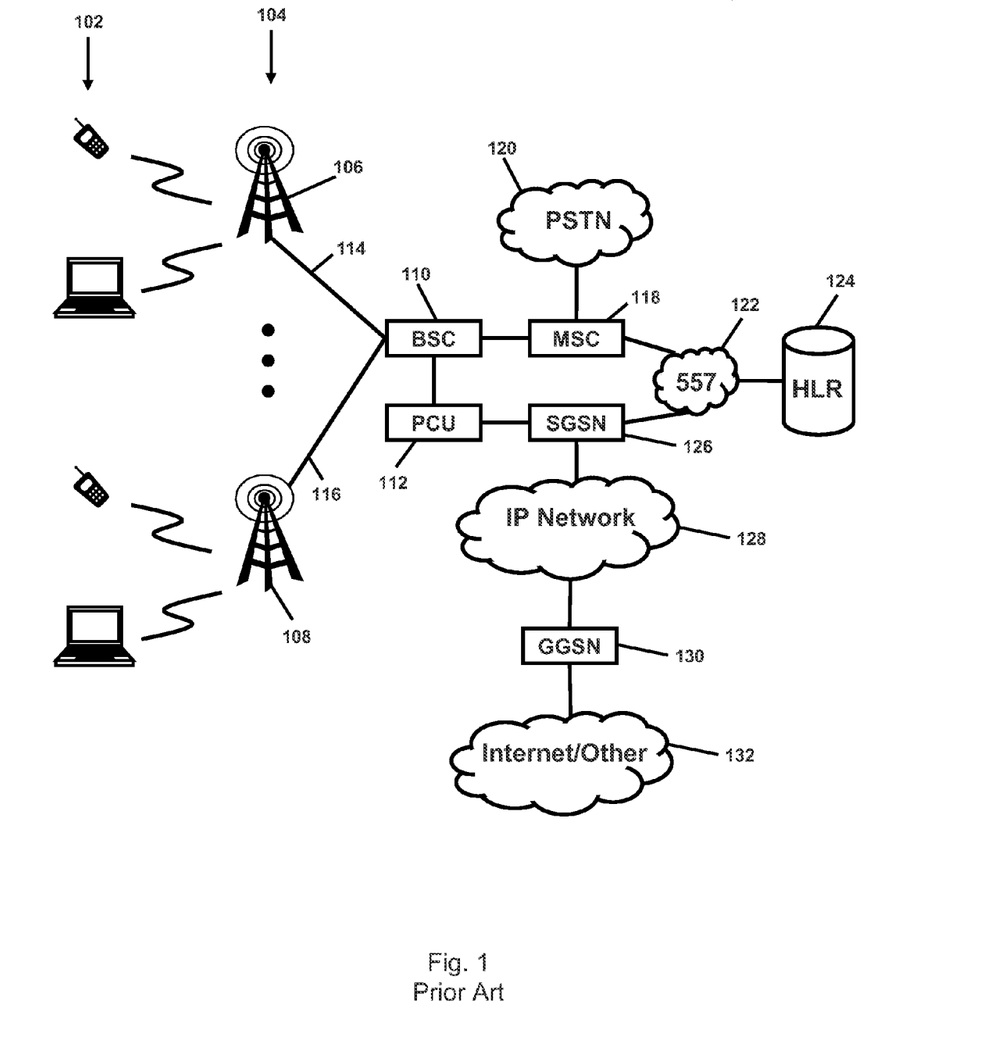
FIG. 1 is a block diagram illustrating elements of a typical GSM network.

FIG. 1 is a block diagram illustrating elements of a typical GSM network. In the example shown, GSM network 100 includes a plurality of mobile devices 102 connected via base transceiver stations 104, represented in FIG. 1 by BTS 106 and BTS 108, to a base station controller (BSC) 110. Mobile devices 102 are mobile network user equipments and are not mobile network provider equipments. The BSC 110 has a packet control unit 112 associated with it, for handling non-voice network data communication (e.g., GPRS) packets. The BTS's are connected to the BSC via Abis links 114 and 116, respectively. The Abis interface is a standards-based interface that typically includes one or more elements and/or requirements that are specific and typically proprietary to an original equipment manufacturer (OEM) and/or other vendor of the BSC. Typically, the Abis interface/link is carried over a dedicated and private T-1/E-1 line. In the example shown, the BSC 110 is connected to a mobile switching center 118, to which the BSC 110 is configured to route inbound voice data received from mobile equipment via a BTS and from which the BSC 110 is configured to receive outbound voice data. The MSC 118 connects to traditional telephone equipment and other networks via the public switched telephone network (PSTN) 120. The MSC 118 is connected via an SS7 (or other) network 122 to a home location register (HLR) 124 used to store subscriber data. To handle non-voice packet (e.g., GPRS) data, the PCU 112 is connected to an SGSN 126. In the example shown SGSN 126 is connected via SS7 network 122 to HLR 124. SGSN 126 is also connected via an IP network 128 and a GGSN 130 to the Internet (or other external packet data network) 132.

Figure 2:
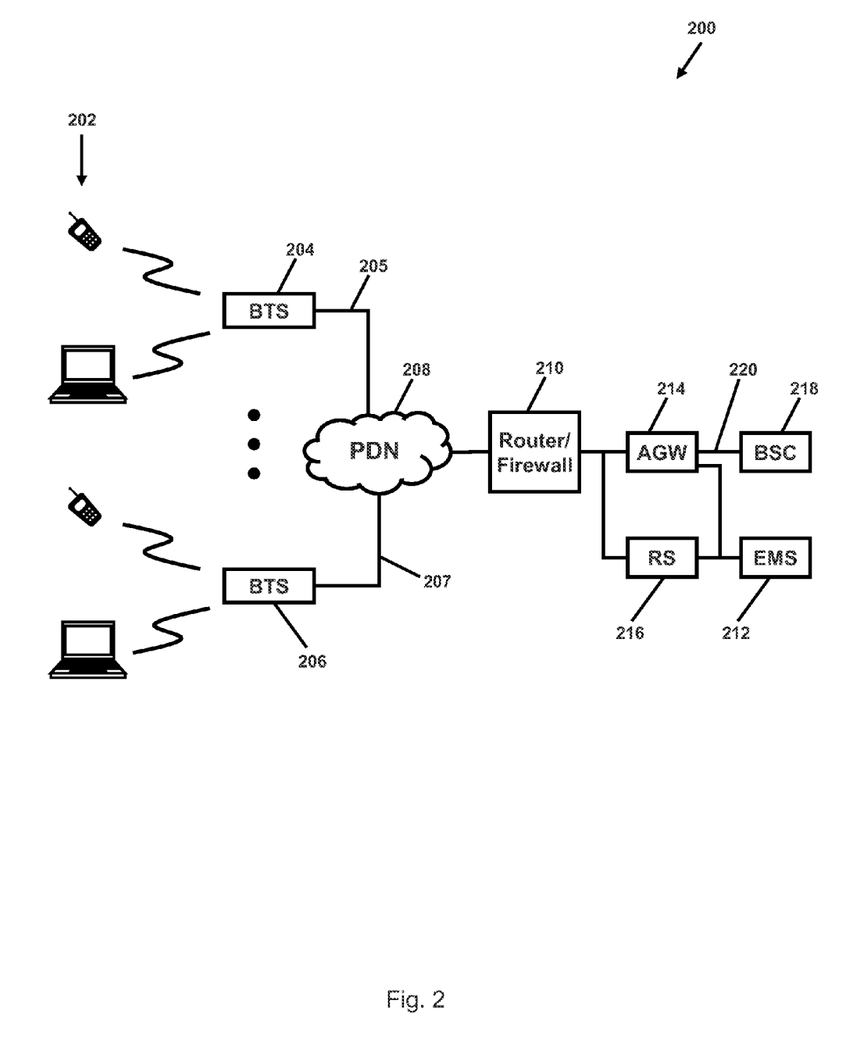
FIG. 2 is a block diagram illustrating an embodiment of a mobile network with packet data network backhaul.

FIG. 2 is a block diagram illustrating an embodiment of a mobile network with packet data network backhaul. In the example shown, the mobile network 200 includes mobile equipment 202 connected to a plurality of base transceiver stations represented in FIG. 2 by BTS 204 and BTS 206. BTS 204 and BTS 206 are connected via a local Internet access connection 205 and 207, respectively, to a packet data network (PDN) 208, such as the Internet. In some embodiments, mobile network data is sent, via PDN 208, between the base transceiver stations represented by BTS 204 and BTS 206, on the one hand, and AGW 214, on the other, using the Internet (IP) protocol. In various embodiments, Internet access connections 205 and 207 comprise a cable, DSL, or other modem collocated with the BTS and/or a local exchange carrier central office (LEC-CO) with DSLAM or cable head-end. Also connected to PDN 208 in the example shown in FIG. 2 is a router/firewall 210 connected to and configured to provide connectivity to and security with respect to an aggregation gateway 214, and a registration server 216. In some embodiments, element management server EMS 212 is connected to router/firewall 210. In some embodiments, router/firewall 210 is omitted and/or does not include a firewall. In various embodiments, element management server 212, an aggregation gateway 214, and a registration server 216 are included in one or more physical computing systems. Element management server 212 enables an administrator to perform operational, administrative, and/or management (OAM) operations with respect to one or more mobile network elements, e.g., BTS 204 or BTS 206. Aggregation gateway (AGW) 214 receives inbound mobile network data (voice, signaling, data, control/management) from one or more base transceiver stations (BTS), via PDN 208, aggregates data from two or more base transceiver stations (if/as applicable), and provides the inbound data to BSC 218 via one or more physical ports, using time division multiplex (TDM) as prescribed by the GSM standard and the BSC OEM's proprietary implementation of the Abis interface 220. In some embodiments, the AGW 214 is capable of interfacing with more than one type of BSC, e.g., with BSC's from two or more vendors. In some such embodiments, the AGW 214 is configured and/or provisioned, e.g., at deployment time, to use the Abis interface API of the particular type of BSC with which it is required to communicate in a particular installation. In some embodiments, an API or other interface specification or definition of the Abis interface as implemented by each BSC vendor/OEM the AGW is desired to be able to support is obtained and used as applicable to configure/provision the AGW to communicate with a particular BSC with which it is required to communicate. In some embodiments, BSC 218 is connected to a PCU, such as PCU 112 of FIG. 1. In some embodiments, AGW 214 is connected to a PCU. For example, BSC 218 is optional, and AGW 214 directly connected to a PCU.

In some embodiments, AGW 214 is configured to present two or more physical base transceiver stations to the BSC as a single logical BTS, to more efficiently use BSC resources in situations in which each BTS serves a relatively small service area and/or number of users. In some embodiments, AGW 214 is configured to map communications received from the BSC to the correct physical BTS and conversely to map communications received from two or more physical base transceiver stations to a single logical BTS prior to forwarding such inbound communications to the BSC.

Registration server 216 is configured to be used to register a BTS and/or other provider equipment with the network, e.g., to authenticate the equipment prior to providing to the equipment one or more session keys to be used in secure communication protocols, identifying (e.g., address) information for other network elements, such as AGW 214, etc.

Each BTS in the mobile network 200 shown in FIG. 2 in some embodiments handles only a small fraction of the call volume/load of a conventional BTS, and in such embodiments AGW 214 promotes more efficient use of limited BSC resources. For example, in some embodiments AGW 214 aggregates data associated with multiple base transceiver stations and provides communication to/from the BSC via a fewer number of physical BSC ports (e.g., a single port). In various embodiments, use of PDN 208 and AGW 214 to transport data between base transceiver stations such as BTS 204 and BTS 206, on the one hand, and BSC 218, on the other, makes it commercially feasible to provide a small form factor and/or relatively low capacity BTS for use in remote (e.g., rural) service areas and/or to provide dedicated service to individuals and/or relatively small groups of users, such as a household or small business, since in addition to not requiring a BSC port for each BTS a dedicated T-1/E-1 line is not required.

While the example shown in FIG. 2 and in other embodiments described herein involves a GSM network and/or uses GSM nomenclature to refer to network elements, the techniques described herein are applied in other embodiments to other types of mobile telecommunications networks, and in particular may be applied wherever a plurality of relatively low capacity base transceiver stations need to exchange mobile communication data with a base station controller or other node having a limited number of relatively very high capacity ports or other resources.

Figure 3:
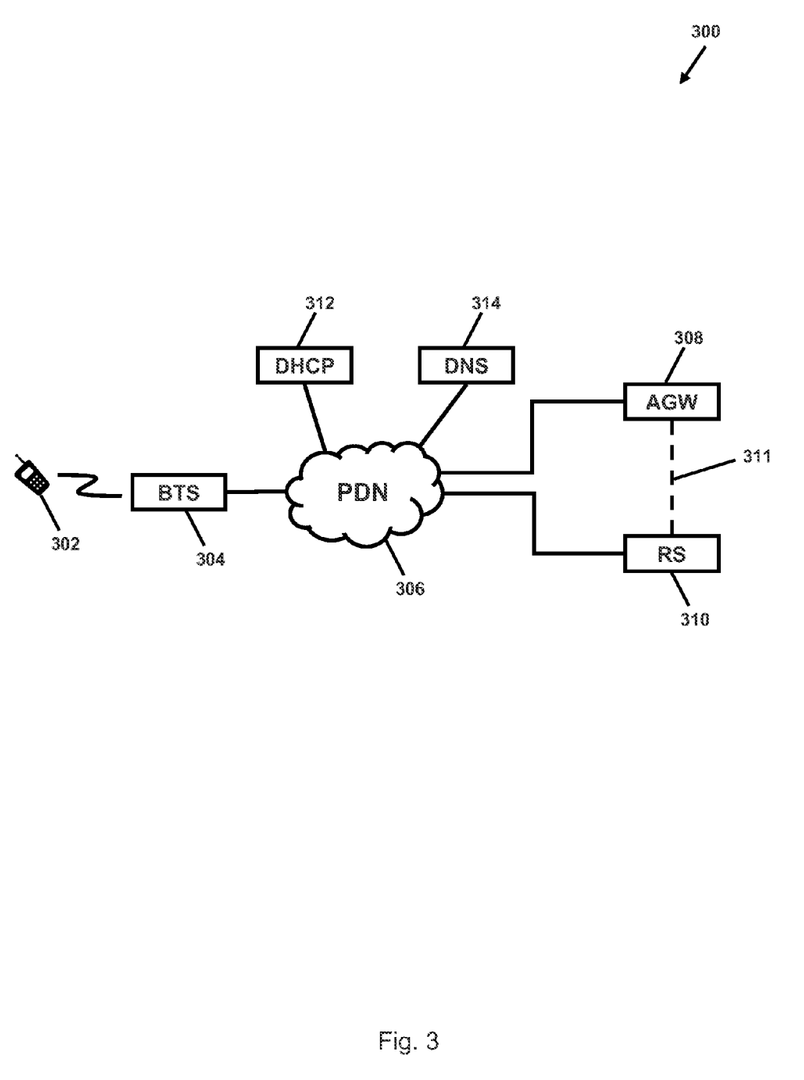
FIG. 3 is a block diagram illustrating an embodiment of a system 300 for authenticating mobile network provider equipment.

FIG. 3 is a block diagram illustrating an embodiment of a system 300 for authenticating mobile network provider equipment. In the example shown, a mobile device 302 connects via an air link to a base transceiver station (BTS) 304. BTS 304 communicates with an associated base station controller (not shown) over a packet data network 306 via an aggregation gateway 308, as in FIG. 2. Also shown in FIG. 3 are a DHCP server 312 used by the BTS 304 to obtain an IP address for use on packet data network 306 and a domain name service (DNS) 314 used by the BTS 304 to resolve URL's into IP addresses. In some embodiments, BTS 304 is configured to register via packet data network 306 with a registration server 310 to obtain access to AGW 308, e.g., by obtaining from the registration server 310 an IP address for AGW 308 known only by registered devices. In some embodiments, BTS 304 is configured and/or provisioned with a URL of the registration server 310, e.g., http://registrationserver.mobileprovider.com, and uses the URL to send a domain name query to DNS 314 to obtain an IP address for the registration server 310. Communication is established by BTS 304 with registration server 310, e.g., and SSL or other privacy protected or otherwise secure connection, and in some embodiments the BTS 304 and RS 310 mutually authenticate, e.g., as described below in connection with FIGS. 5 and 6. In the example shown, registration server 310 and AGW 308 are connected via a secure private connection 311 that enables them to exchange data in a reliable and trusted way. In some embodiments AGW 308 and RS 310 are included in the same physical computing system and connection 311 is a secure internal connection.

In some embodiments, BTS 304 includes an "equipment identity module" similar to a "subscriber identity module" (SIM), which is a specially-programmed "smart card" with a standards-based small form factor, used in GSM mobile networks to securely store and provision a mobile equipment such as a phone. In GSM phones, for example, a SIM includes a secret (e.g., key) stored in the SIM at its manufacture in a manner that cannot be read out from the SIM or otherwise discovered (e.g., by physically disassembling the SIM) once the manufacturing process has been completed, because attempts to access the secret destroy the SIM and the secret it embodies. When a GSM phone enters a new service area, the SIM data is used to authenticate the phone to the network, identifying the subscriber to the network. In some embodiments, BTS 304 includes and/or is configured and/or provisioned by installing an EIM (or other smart card or other device embodying and/or storing a key or other secret that the EIM cannot be made to provide as output and which is configured to use the secret to perform a cryptographic function). The secret and its association with the EIM (e.g., by serial or other identifying number and/or name) are recorded at the time the EIM is manufactured, so that the secret embodied in and/or stored on the EIM is shared in a secure way between a BTS on which the EIM is installed and an RS configured to know the shared secret. The secret is used to authenticate the BTS to the mobile network (via the RS) and to authenticate the RS to the BTS, e.g., via a challenge and response, as described more fully below. In some embodiments, a uniform resource locator (URL) or other locator and/or address for the RS is programmed and/or otherwise embodied in the EIM. The URL or other locator and/or address is used in some embodiments to enable the BTS to authenticate itself to the network via a central RS and through contact with the RS to discover an address/locator for a servicing aggregation gateway (AGW) or other node, enabling the BTS (or other equipment) to automatically discover locator/address information for a servicing AGW (or other node). Such auto-discovery eliminates the need to provision the BTS or other equipment by configuring it with the locator/address for the AGW or other node, and lessens the burden associated with changing the locator/address for the AGW or other node, since the BTS or other equipment serviced by the AGW or other node would not have to be reconfigured and instead could auto-discover the new locator/address information from the RS. The preceding approach also allows the locator/address for the AGW and/or other node to be kept hidden from disclosure to the general public, reducing significantly the possibility that the AGW or other node will be subjected to a denial of service type of attack, e.g., via a packet-based or other public network used by the BTS to communicate with the AGW in some embodiments.

Figure 4:
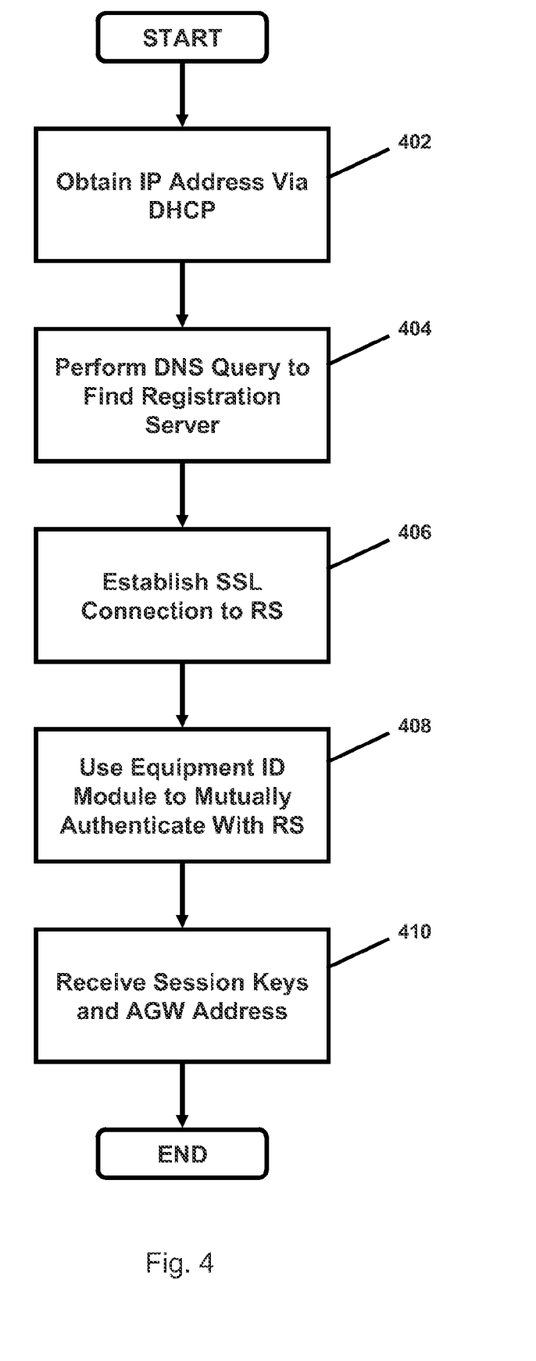
FIG. 4 is a flow chart illustrating an embodiment of a process for establishing a connection with a mobile network element, such as an aggregation gateway, via an IP or other packet data network.

FIG. 4 is a flow chart illustrating an embodiment of a process for establishing a connection with a mobile network element, such as an aggregation gateway, via an IP or other packet data network. In some embodiments, the process of FIG. 4 is implemented on a BTS such as BTS 304 and used, e.g., when the BTS first starts up, to establish communication with an aggregation gateway such as AGW 308. In the example shown, an IP address is obtained via DHCP (402) and a DNS query is sent to obtain an IP address for a registration (or other authentication) server (404). In some embodiments, the BTS is configured and/or provisioned to use a URL or other locator to obtain an IP address for the registration server. An SSL (or other secure) connection is established with the registration server (406), after which a shared secret, e.g., a key or other secret stored in a SIM, is used to mutually authenticate the BTS and the RS (408), as described more fully below in connection with FIGS. 5 and 6. Once the authentication has been completed, an IP address for the AGW and session keys needed to communicate securely with the AGW over the IP or other packet data network are received from the registration server (410). In some embodiments, voice data is sent between the BTS and the AGW using secure real-time transport protocol (S-RTP) via UDP over IP and signaling and/or other data are sent via SCTP over IPSEC, and the keys received at (410) include keys needed to communicate securely using S-RTP, SCTP, and/or other protocols, as applicable.

In some embodiments, making the IP address of the RS but not that of the AGW publicly available (e.g., via a DNS query) protects the AGW against a denial of service or similar attack. In some embodiments, communication between a BTS and RS is infrequent (e.g., once a day), especially after initial BTS startup, and the nature of the communication between a BTS and RS is such that a relatively short term disruption of communication typically will not affect core network operations. By contrast, a successful denial of service attack on the AGW could disrupt the timely transmission and receipt of call data, thereby disrupting core services. In some embodiments, the RS and AGW are provided on the same physical system, and in some such embodiments, the physical system has a separate IP address for each.

Figure 5:
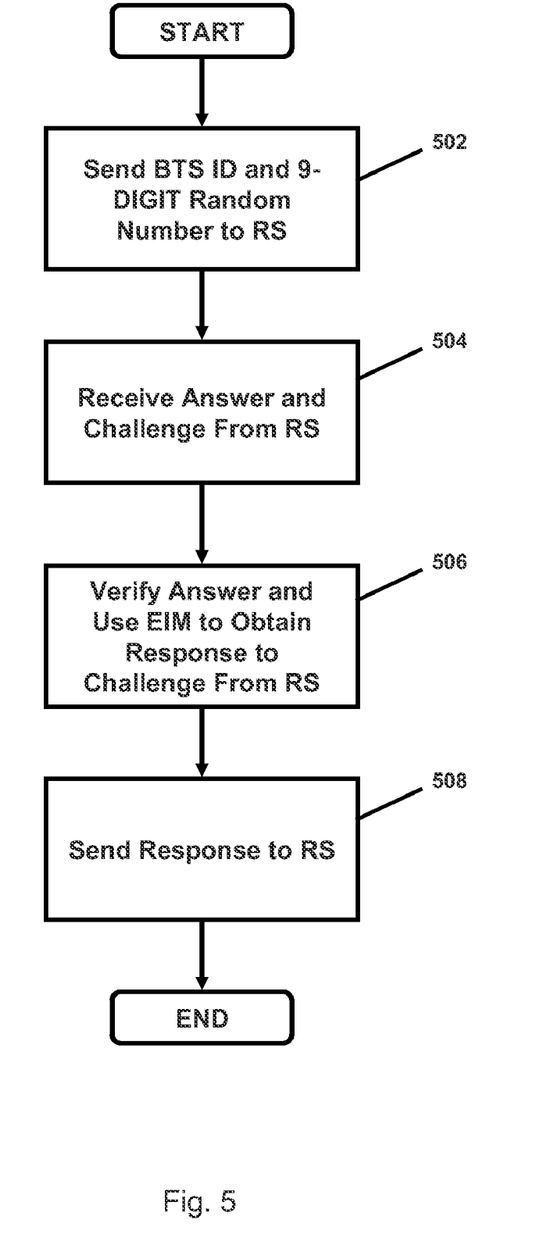
FIG. 5 is a flow chart illustrating an embodiment of a process for mutually authenticating a base transceiver station (BTS) and registration server (RS), from the perspective of the BTS.

FIG. 5 is a flow chart illustrating an embodiment of a process for mutually authenticating a base transceiver station (BTS) and registration server (RS), from the perspective of the BTS. In the example shown, the BTS sends an associated unique identifier (e.g., a "BTS ID") and a 9-digit (or other size) random number to the registration server (502). An answer and return challenge is received from the RS (504). The answer received from the RS is verified, e.g., by using the EIM to perform a prescribed computation using the 9-digit number sent to the registration server and the key or other secret held in/by the EIM, and the RS deemed trustworthy if the result matches the answer received from the RS, and a similar computation is performed using the number comprising the challenge received from the RS to obtain a response to send to the RS (506). A response message including the response computed at (506) (i.e., the result of the computation performed using the challenge number sent by the RS and the key/secret stored in/by the EIM) is sent to the RS (508).

Figure 6:
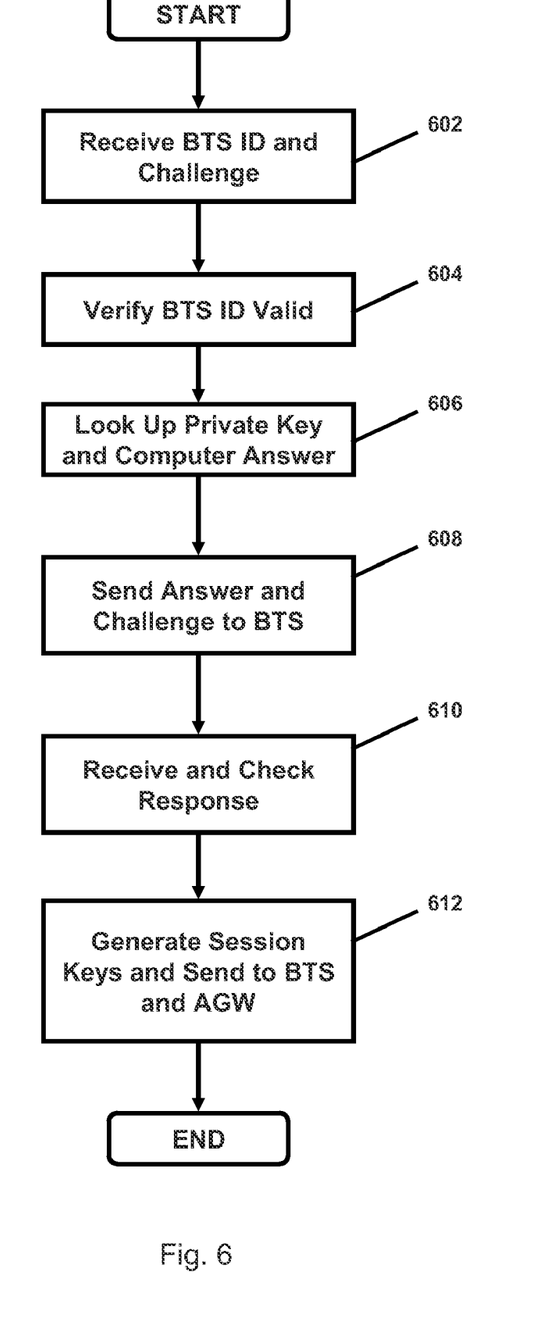
FIG. 6 is a flow chart illustrating an embodiment of a process for mutually authenticating a base transceiver station (BTS) and registration server (RS), from the perspective of the RS.

FIG. 6 is a flow chart illustrating an embodiment of a process for mutually authenticating a base transceiver station (BTS) and registration server (RS), from the perspective of the RS. A BTS identifier and challenge (e.g., 9-digit number) are received from a BTS (602). Mobile network records are checked to verify the BTS identifier is still valid/active (604), e.g., that it has not been stolen or its rights to connect otherwise terminated, e.g., for non-payment of bills. The BTS identifier is used to look up a shared secret, such as a key or other secret stored in/by an EIM installed at the BTS associated with the received BTS identifier, and the shared secret and the challenge number received from the BTS are used to compute an answer (606). The answer and a challenge (e.g., a random number) are sent to the BTS (608). A response is received from the BTS and the shared secret used to check the response by performing at the RS using the shared secret the computation the BTS is configured to perform using the EIM (610). If the computation performed at the RS yields the same result as the response received from the BTS, the BTS is considered authenticated and is trusted. Session keys are generated and sent to the BTS and the AGW (612), enabling secure communication over an IP and/or other packet data network between the BTS and the AGW. In some embodiments, as described above, (612) includes sending to the BTS an IP address for the AGW. In some embodiments, the keys provided by the RS have a prescribed and/or specified (e.g., by the RS) lifetime and the BTS must re-register, e.g., as described above, to obtain new keys once the lifetime of a current set of keys expires. In some embodiments, the session keys are generated at the RS dynamically, e.g., randomly, and sent to both the BTS and the AGW. In some embodiments, the keys are sent to the AGW via a private/secure connection, such as connection 311 of FIG. 3.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing mobile network security, comprising:

registering a first mobile network provider equipment using a secret data that is known to a registration entity with which the first mobile network provider equipment is configured to register, the secret data and an address of the registration entity being embodied in a physical device associated with the first mobile network provider equipment in a manner that enables the physical device to be used to perform a cryptographic function using the secret data but prevents the physical device from being used to provide the secret data as output, the physical device providing the first mobile network provider equipment with the address of the registration entity to facilitate an initial communication from the first mobile network provider equipment to the registration entity, the initial communication comprising a unique identifier of the first mobile network provider equipment and a first random number;

mutually authenticating between the first mobile network provider equipment and the registration entity via an SSL connection over an IP-protocol-based network;

after mutual authentication, receiving, from the registration entity, encryption data usable to communicate securely with a second mobile network provider equipment over the IP-protocol-based network, the encryption data comprising one or more keys and an IP address of the second mobile network provider equipment, the IP address of the second mobile network provider equipment not being publicly available, the second mobile network provider equipment being coupled to a base station controller via a dedicated line, the second mobile network provider equipment aggregating mobile communications from the first mobile network provider equipment and at least another mobile network provider equipment and sending the aggregated mobile communications to the base station controller via the dedicated line, the second mobile network provider equipment also receiving the one or more keys from the registration entity;

sending voice data from the first mobile network provider equipment to the second mobile network provider equipment using S-RTP via UDP over IP using the one or more keys; and sending signaling data from the first mobile network provider equipment to the second mobile network provider equipment via SCTP over IP-SEC using the one or more keys, wherein the first mobile network provider equipment, the second mobile network provider equipment and the registration entity are disposed communicatively on a provider network side of an air link that supports voice and data communications with mobile phones, the mobile phones being configured to support GSM and GPRS communications.

2. The method according to claim 1, wherein the one or more keys comprise one or more session keys.

3. The method according to claim 1, wherein the IP-protocol-based network is connected to the registration entity via a router/firewall.

4. The method according to claim 1, wherein the one or more keys have a specified lifetime before expiring.

5. The method according to claim 1, wherein the physical device comprises a smart card or an equipment identification module.

6. The method according to claim 1, wherein the first mobile network provider equipment comprises a base transceiver station, wherein the second mobile network provider comprises an aggregated gateway that services a plurality of base transceiver stations including the base transceiver station, and wherein the registration entity comprises a registration server.

7. The method according to claim 1, wherein the IP protocol network is used as a backhaul of a mobile network.

8. The method according to claim 1, further comprising receiving a Uniform Resource Locator (URL) or an Internet Protocol (IP) address that can be used by the first mobile network provider equipment to locate the second mobile network provider equipment.

9. The method according to claim 1, wherein registering the first mobile network provider equipment includes establishing a secure connection between the first network provider equipment and the registration entity.

10. The method according to claim 9, wherein the secure connection comprises Secure Socket Layer (SSL) or other privacy-protected session.

11. The method according to claim 1, wherein the second network provider equipment comprises a base station controller.

12. The method according to claim 1, wherein the second network provider equipment comprises an entity forwarding data received from the first network provider equipment via the packet data network to a base station controller.

13. The method according to claim 1, wherein the second network provider equipment and the registration entity are included in the same physical computing system.

14. The method according to claim 13, wherein the second network provider equipment and the registration entity are both associated with different Internet Protocol (IP) addresses.

15. The method according to claim 1, wherein the secret data is embodied in the physical device at a time the physical device is manufactured.

16. The method according to claim 6, wherein the aggregated gateway that services the plurality of base transceiver stations presents two or more base transceiver stations as a single logical base transceiver station.

17. The method according to claim 1, wherein registering the first mobile network provider equipment using the secret data includes sending to the registration entity a random value, receiving from the registration entity a response to the random value, using the physical device to perform a computation using the secret data and the random value, comparing the result of the computation with the received response, and concluding the registration entity is trustworthy if the received response matches the result of the computation.

18. The method according to claim 1, wherein registering the first mobile network provider equipment using the secret data includes receiving from the registration entity a random value, performing a computation using the physical device and the random value, and sending to the registration entity a result of the computation.

19. The method according to claim 1, wherein the first mobile network provider equipment and the registration entity mutually authenticate using at least a challenge and response method.

20. The method according to claim 1, wherein the second mobile network provider equipment and the registration entity communicate over a secure private connection.

21. The method according to claim 1, wherein encryption data is dynamically generated by the registration sever.

22. A system for providing mobile network security, comprising:
a physical device of a first base station in which an address of the registration entity and secret data are embodied in a manner that enables the physical device to be used to perform a cryptographic function using the secret data but prevents the physical device from being used to provide the secret data as output, the physical device providing the first base station with the address of the registration entity to facilitate an initial communication from the first base station to the registration entity, the initial communication comprising a unique identifier of the first base station and a first random number;
a processor of the first base station configured to use the physical device to register the first base station with a registration entity that knows the secret data, the processor being configured to perform the cryptographic function using the secret data; and
a communication interface of the first base station configured to receive, from the registration entity after mutual authentication, encryption data usable to communicate securely over an IP-protocol-based network, the encryption data comprising one or more keys and an IP address of a gateway, the IP address of the gateway not being publicly available, the gateway being coupled to a base station controller via a dedicated line, the gateway aggregating mobile communications from the first base station and a second base station and sending the aggregated mobile communications to the base station controller via the dedicated line, the gateway presenting the first base station and the second base station as a single logical base station to the base station controller,
wherein the first base station, the gateway, the second base station and the registration entity are disposed communicatively on a provider network side of an air link,
wherein the base station and the registration entity mutually authenticate over the IP-protocol-based network, and
wherein, after the base station and the registration entity mutually authenticate, then registration entity transmits the one or more keys to the communication interface of the base station and to the gateway so that the base station and the base station controller can communicate securely via the IP-protocol-based network and the dedicated line.

23. The system according to claim 22, the communication interface is further configured to receive from the registration entity a Uniform Resource Locator (URL) or an Internet Protocol (IP) address that can be to locate the gateway.

24. The system according to claim 22, wherein the physical device comprises a smart card or an equipment identification module.

25. The system according to claim 22, wherein the wherein the one or more keys are characterized by a specified lifetime before expiring.

26. The system according to claim 22, wherein the base station communicates, via a router/firewall, with the gateway and the registration server.

27. A computer program product for providing mobile network security, the computer program product being embodied in a tangible computer readable storage medium and comprising computer instructions for:
registering a first mobile network provider equipment using a secret data that is known to a registration entity with which the first mobile network provider equipment is configured to register, the secret data and an address of the registration entity being embodied in a physical device associated with the first mobile network provider equipment in a manner that enables the physical device to be used to perform a cryptographic function using the secret data, but prevents the physical device from being used to provide the secret data as output, the physical device providing the first mobile network provider equipment with the address of the registration entity to facilitate an initial communication from the first mobile network provider equipment to the registration entity, the initial communication comprising a unique identifier of the first mobile network provider equipment and a first random number; and
after authentication with the registration entity, receiving encryption data from the registration entity and auto-discovering a second mobile network provider equipment, the encryption data comprising an IP address of the second mobile network provider equipment and one or more keys, the one or more keys also being provided by the registration entity to the second mobile network provider equipment so that the first mobile network provider equipment and the second mobile network provider equipment can communicate securely over an IP-protocol-based network, the IP address of the second mobile network provider equipment not being publicly available, the second mobile network provider equipment being coupled to a base station controller via a dedicated line, the second mobile network provider equipment aggregating mobile communications from the first mobile network provider equipment and a third mobile network provider equipment and sending the aggregated mobile communications to the base station controller via the dedicated line,
wherein the first mobile network provider equipment, the second mobile network provider equipment, the third mobile network provider equipment and the registration entity are disposed communicatively on a provider network side of an air link, the air link supporting voice and data communications with a mobile wireless communications device.

28. The computer program product according to claim 27, wherein the mobile wireless communications device is configured to support GSM communications and GPRS communications.

29. The computer program product according to claim 27, wherein the physical device comprises a smart card or an equipment identification module.

30. The computer program product according to claim 27, wherein the first mobile network provider equipment is a base transceiver station, and wherein the base transceiver station communicates, via a router/firewall, with the second mobile network provider equipment and the registration server.

31. The computer program product according to claim 27, wherein the one or more keys comprise one or more session keys that are characterized by a specified lifetime before expiring, and wherein the mutual authentication between the first mobile network provider equipment and the registration entity uses at least a challenge and response method.

* * * * *